United States Patent [19]

St. John et al.

[11] Patent Number: 4,513,314

[45] Date of Patent: Apr. 23, 1985

[54] INK USAGE ESTIMATOR

[75] Inventors: Karl M. St. John, Huntington Station; Nicholas J. Reeber, Hauppauge; Sheldon J. Kerbel, Merrick, all of N.Y.

[73] Assignee: Hazeltine Corporation, Commack, N.Y.

[21] Appl. No.: 422,637

[22] Filed: Sep. 24, 1982

[51] Int. Cl.³ .............................................. H04N 1/46
[52] U.S. Cl. ..................................................... 358/76
[58] Field of Search .......................................... 388/76

[56] References Cited

U.S. PATENT DOCUMENTS 4,393,398   7/1983   Horiguchi et al. .................. 358/76

OTHER PUBLICATIONS

Kline, Raymond, *Digital Computer Design*, Prentice-Hall, Inc., New Jersey, 1977, p. 173.

Primary Examiner—Richard Murray
Attorney, Agent, or Firm—E. A. Onders; F. R. Agovino

[57] ABSTRACT

An ink usage estimator signal is developed representing the amount of ink required to print on a receptive media a portion of an image which is on film, such as a color separation. A video signal representing the portion of the selected image is gated by area pulses during periods of the video signal which define the selected portion of the image. The gated video signal is averaged to develop the ink usage estimator signal, which represents the amount of ink required to print the selected portion of the image.

10 Claims, 3 Drawing Figures

INK USAGE ESTIMATOR

BACKGROUND OF THE INVENTION

1. Field of the Invention

The invention relates generally to apparatus for estimating the amount of ink required to print on paper or other receptive media, a portion of an image which is on film and, in particular, to apparatus for estimating the amount of ink required to print on the media a portion of an image which is on a color separation film.

2. Description of the Prior Art

A separation is a film used to print an image on paper or other receptive media. Frequently, it is necessary to estimate the amount of ink required to print an image or portion of the image. In the past, estimating the amount of ink required has been based on past experience. In particular, the image to be printed is compared to a similar image which has been printed and for which the amount of ink required is known. Such estimations have been found to be very inexact and limited to past experience. With increasing costs, it becomes more and more necessary to accurately estimate the amount of ink required to print an image or a portion of the image.

SUMMARY OF THE INVENTION

It is an object of this invention to provide apparatus which generates an ink usage estimator signal representing the amount of ink required to print on a selected media a portion of a image which is on a film such as a color separation. It is a further object of this invention to provide an ink usage estimator apparatus for use with a previewer which simulates the printed image by developing a video signal that corresponds to the printed image.

First means defines a portion of the image and provides area pulses during the periods of video signal which represent a selected portion of the image. Second means gates the video signal and the area pulses and provides an area-defined video signal corresponding to the video signal periods defining the selected portion of the image. Third means averages the area-defined video signal and provides an output signal corresponding to an average of the area-defined video signal, this output being the ink usage estimator signal.

For a better understanding of the present invention, together with other and further objects, reference is made to the following description, taken in conjunction with the accompanying drawings, and its scope will be pointed out in the appended claims.

DETAILED DESCRIPTION OF THE INVENTION

The invention relates to an apparatus for providing an ink usage estimator signal which represents the amount of ink required to print on a receptive media, such as paper, a portion of an image which is on film, such as a color separation. The process involved in printing an image from a color original includes scanning the color original to create separations, previewing or proofing the separations to determine any necessary color corrections and creating printing plates from the color corrected separations. During this process, it is frequently important to know the amount of ink which will be required to print a particular color positive. Specifically, the amount of ink of each color corresponding to each separation provides useful information in estimating the cost of printing. Ink usage information may also assist in estimating the ink key (fountain) settings for the printing press.

For a given color, the amount of ink required to fully cover a certain area of that color is generally known. Therefore, information specifying the percentage of that color in a given separation, as compared to a solid separation of that color provides information that permits estimation of the amount of ink of that color which would be required to print an image corresponding to the separation. For example, an oil-base ink printed on glossy paper may require 1.0 units of magenta ink to completely cover an 8.5"×11" page. An image on an 8.5"×11" magenta separation having 38% coverage would then require approximately 0.38 units of magenta ink to print the image with oil-base ink on glossy paper.

The invention may be used with a separation previewer such as disclosed in U.S. Pat. Nos. 3,131,252 and 3,800,071 or any other commercial separation previewer, such as Hazeltine Model No. SP-1620. Generally, such separation previewers scan a separation film which is to be previewed and simulate the image that would be printed from the separation by providing a video signal (representing the printed image) to a raster display.

Figure 1:
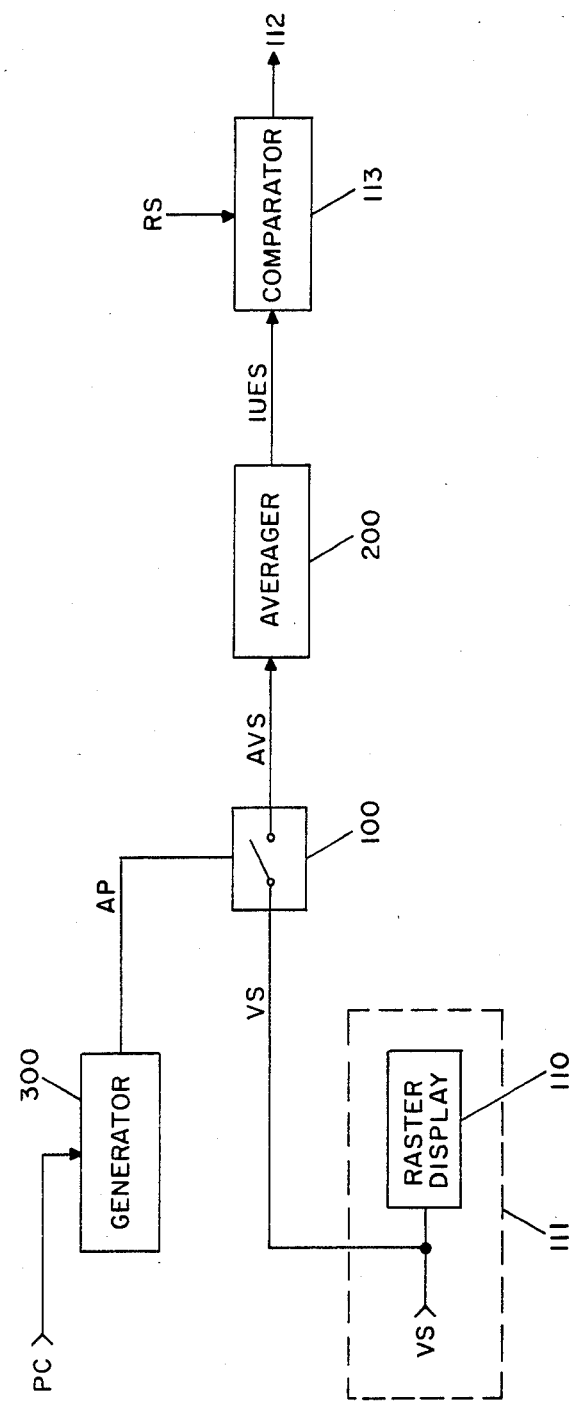
FIG. 1 is a block diagram of an ink usage estimator according to the invention.

As illustrated in FIG. 1, video signal VS is generated by previewer 111 for display by raster display 110 and is provided to gated switch 100, which is controlled by an area pulse AP provided by pulse generator 300. Alternatively, in digital circuits gated switch 100 may be an AND gate. The pulse generator 300 is controlled by a pulse control signal PC which turns the pulse generator 300 on and off. Pulse generator 300 provides a series of area pulses AP which close switch 100 during the periods of video signal VS which define the portion of the image to be considered for estimation.

As a result, gated switch 100 provides an area video signal AVS which corresponds to the video signal periods defining the image or the portion thereof which will be considered for estimation. Averager 200 averages only the area video signal AVS and provides an output signal which is the ink usage estimator signal IUES.

The ink usage estimator signal IUES may then be compared by comparator 113 to a reference signal RS representing the ink usage estimator signal of a reference separation which is completely covered. Alternatively, the ink usage estimator signal IUES may be calibrated by adjusting its magnitude. Generally, the amount of ink necessary to print the reference separation is known so that output 112 of comparator 113 or the calibrated signal indicates the percentage of ink required to print the portion of the image considered as compared to the known amount of ink required to print the referenced separation.

Figure 2:
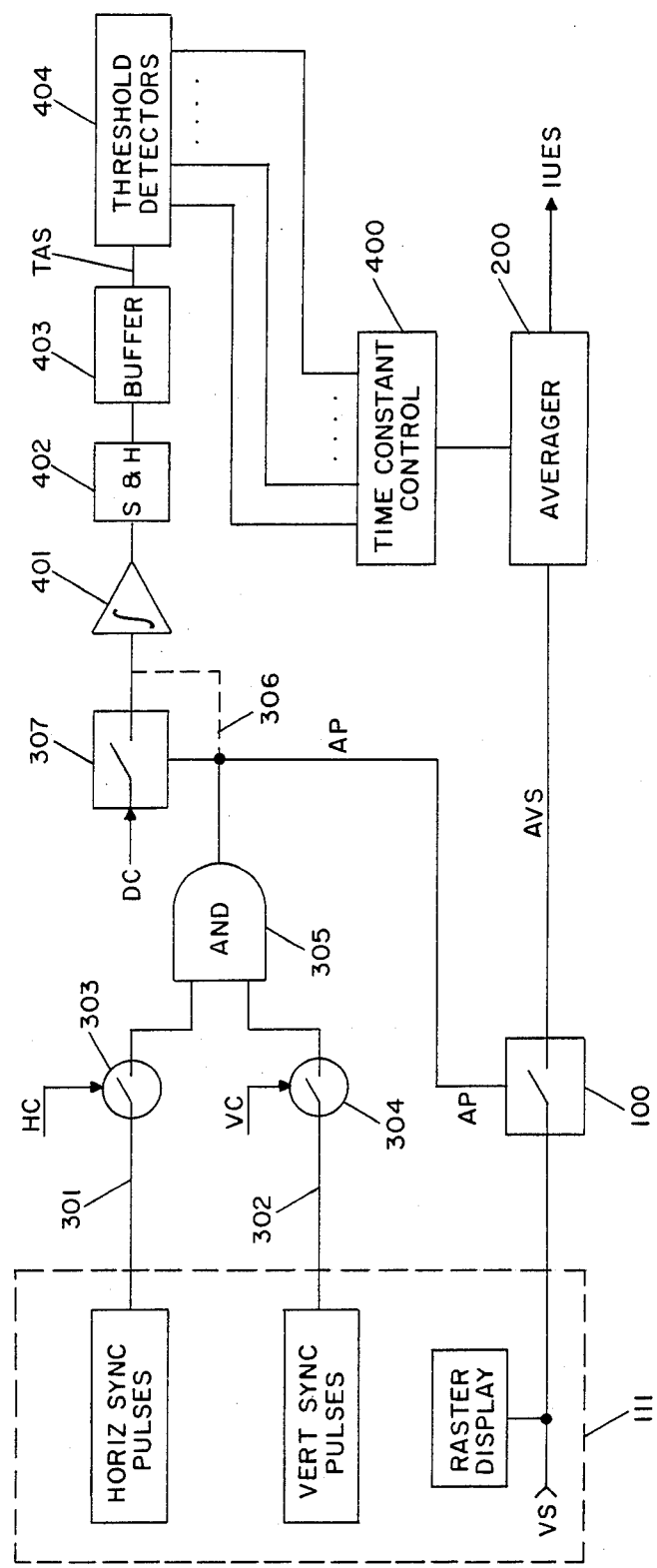
FIG. 2 is a block diagram of another embodiment of an ink usage estimator according to the invention.

FIG. 2 illustrates another embodiment of the invention wherein the video signal VS is provided through gated switch 100 controlled by area pulses AP to yield an area-defined video signal AVS. The area pulses AP are generated in the following manner. Horizontal sync signal 301 is generated from horizontal sync pulses generated by the separations previewer III and vertical sync signal 302 is generated from vertical sync pulses generated by the separations previewer III. The horizontal sync signal 301 is routed through switch 303 which is selectively opened or closed depending on a horizontal control signal HC provided thereto. Similarly, the vertical sync signal 302 is routed through switch 304 which is selectively opened or closed depending on a vertical control signal VC provided thereto. The outputs of these switches are provided to AND gate 305 which provides the area pulses AP corresponding to the periods of the video signal VS which define the portion the image to be considered for estimation.

Horizontal control signal HC closes switch 303 during the periods of time that raster display 110 is scanning horizontal lines which are within the portion of the image to be considered for estimation. Similarly, vertical control signal VC closes switch 304 during the periods of time that raster display 110 is scanning the vertical lines within the portion of the image to be estimated. AND gate 305 provides area pulses AP which are essentially pulses corresponding to the period of time during which the raster display is scanning the portion of the image to be considered for estimation. Area pulses AP are applied to the control input of gated switch 100 which is closed whenever an area pulse is present. As a result, gated switch 100 provides area video signal AVS which is the portion of the video signal VS which defines the portion of the image being considered for estimation. Area video signal AVS is provided to averager 200 which provides as its output an ink usage estimator signal IUES.

Figure 3:
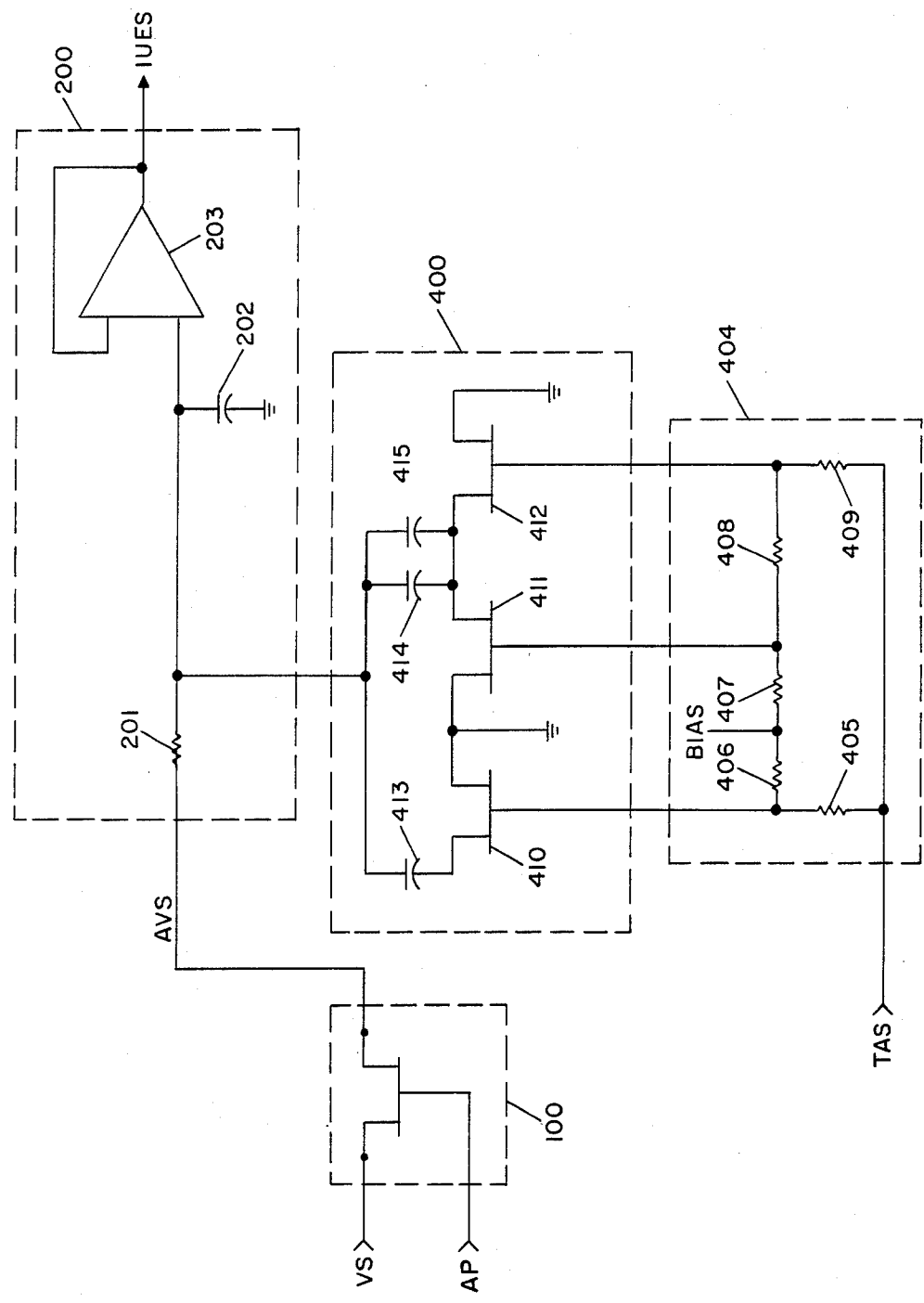
FIG. 3 is a simplified circuit diagram of a portion of the embodiment illustrated in FIG. 2.

As illustrated in FIG. 3, averager 200 may be an RC circuit including resistor 201 and capacitor 202 followed by operational amplifier 203. Such RC circuits have a time constant T which is equal to (R)×(C); (i.e. T=RC).

The averaging time period depends upon the amount of area which is being considered for ink estimation. This is because the video signal VS is gated through switch 100 to the averager 200. During the period that no area pulses AP are provided to switch 100, the input of averager 200 views an open circuit. During this period the voltage across capacitor 202 does not change due to the open circuit. The period, as viewed by averager 200, is the time during which the averager is provided with an area video signal AVS. Since this time can vary over a wide range, depending on the portion of the image being considered for ink estimation, the invention includes a time constant control 400 for adjusting the time constant of averager 200 in response to the area of the portion of the image being considered for ink estimation.

Averagers employing RC circuits are generally configured to have a time constant in the range of five to ten repetition periods over which averaging takes place to insure consistent averaging. For a standard raster display of a separation previewer displaying a field every 1/30 second, the averager would be configured to reach equalibrium in ten (10) repetition periods, i.e. ⅓ second. However, when only a portion of the entire field is being considered for ink estimation, the period of time the averager requires to reach equilibrium is much greater because a signal is being applied to the averager for only a small portion of the field scanning time of 1/30 second due to the operation of gated switch 100.

Therefore, the actual time an RC averager requires to reach equilibruim is dependent upon its time constant T and the amount of time averager 200 receives area-defined video signal AVS.

Referring to FIG. 2, the area pulses AP may be provided via line 306 to integrator 401 which integrates the pulses and provides the integrated signal to sample and hold circuit 402 having an output fed to buffer 403. Alternatively, a DC voltage may be applied through gated switch 307 to integrator 401 with area pulses AP applied to the control terminal to close switch 307 whenever area pulses AP are present. This results in buffer 403 providing a total area signal TAS to threshold detectors 404. Threshold detectors 404 detect the level of total area signal TAS and provide the detected level information to time constant control 400 which changes time constant T of averager 200 in response thereto. Alternatively, the level of the total area signal may be detected and used to continuously adjust a variable resistor or variable capacitor used in place of resistor 201 or capacitor 202, thereby continuously adjusting the time constant, since T=RC.

As illustrated in FIG. 3, threshold detectors 404 may be a resistive bridge including a plurality of resistors 405, 406, 407, 408 and 409 which are biased. The bridge is selectively connected to FET switches 410, 411, and 412 which add elements to the RC averager such as capacitors 413, 414 and 415 in parallel to capacitor 202 of averager 200, thereby changing the time constant T of averager 200.

The ink usage estimator apparatus according the the invention is not intended to take into account press limitations, ink spread or other factors which affect ink usage and which are not related to the image on the separation. Although the invention has been described from an anolog point of view, those skilled in the art will recognize that digital circuits may similarly be used.

The invention results in a simple and convenient way of electronically masking a portion of an image created from a separation and estimating the amount of ink required to print the unmasked portion. In addition, by selecting portions of the image which correspond to areas which will be printed by a given ink key of the printing press, it is possible to estimate the setting of the given key.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for providing an ink usage estimator signal representing the amount of ink required to print on a receptive media such as paper a portion of an image which is on film, said apparatus for use with a previewer which simulates the image by providing to a raster display a video signal corresponding to the image, said apparatus comprising:
   first means for selecting the portion of the image to be estimated and for providing area pulses during the periods of said video signal which represent the selected portion of the image;
   second means for gating the video signal with the area pulses to provide an area-defined video signal corresponding to the video signal periods which define the selected portion of the image;

third means including an RC circuit having a time constant, said third means for averaging the area-defined video signal to provide an output signal corresponding to an average of the area-defined video signal; and fourth means for varying said time constant in accordance with the area of the selected portion of the image whereby said output signal is said ink usage estimator signal.

2. The apparatus of claim 1 wherein said first means comprises a pulse generator preset to provide an area pulse during each period when the raster display is scanning the selected portion of the image.

3. The apparatus of claim 2 wherein said second means is a gated switch.

4. The apparatus of claim 3 wherein said gated switch is an FET switch controlled by the area pulses.

5. The apparatus of claim 1 further comprising fifth means for providing a total area signal corresponding to the selected area of the portion of the image and wherein said fourth means is responsive thereto.

6. The apparatus of claim 5 wherein said fourth means further includes elements connected to the RC circuit by switches which may be selectively opened and selectively closed to vary the time constant.

7. The apparatus of claim 6 wherein said elements are capacitors and said fourth means further comprises a plurality of threshold detectors, each threshold detector controlling at least one of the switches.

8. The apparatus of claim 7 wherein said first means comprises means for providing a first pulse during periods that the raster display is scanning horizontally within the selected portion of the image, and means for providing a second pulse during periods that the raster display is scanning vertically within the selected portion of the image and a gated switch having an input and a control to which said pulses are applied and an output providing said area pulses.

9. The apparatus of claim 8 wherein said fifth means comprises means for providing a voltage to an integrator during each period that the raster display is scanning the selected portion of the image, and a sample and hold means for sampling and holding the resulting integrated voltage.

10. The apparatus of claim 1 wherein said first means comprises means for providing a first pulse during a period that the raster display is scanning horizontally within the selected portion of the image, and means for providing a second pulse during the period that the raster display is scanning vertically within the selected portion of the image and a gated switch having an input and a control to which said pulses are applied and an output providing said area pulses.

* * * * *